United States Patent
Auberger et al.

(10) Patent No.: US 7,804,898 B2
(45) Date of Patent: Sep. 28, 2010

(54) METHOD AND APPARATUS FOR ENCODING A DIGITAL VIDEO SIGNAL

(75) Inventors: Stéphane Auberger, Paris (FR); Yann Picard, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1239 days.

(21) Appl. No.: 10/522,464

(22) PCT Filed: Jul. 9, 2003

(86) PCT No.: PCT/IB03/03063
§ 371 (c)(1),
(2), (4) Date: Jan. 26, 2005

(87) PCT Pub. No.: WO2004/014086
PCT Pub. Date: Feb. 12, 2004

(65) Prior Publication Data
US 2006/0023950 A1    Feb. 2, 2006

(30) Foreign Application Priority Data
Jul. 31, 2002   (EP) .................... 02291935

(51) Int. Cl.
H04N 7/12    (2006.01)
H04N 11/02   (2006.01)
H04N 11/04   (2006.01)
H04B 1/66    (2006.01)

(52) U.S. Cl. .................... 375/240.1
(58) Field of Classification Search .......... None
See application file for complete search history.

(56) References Cited

U.S. PATENT DOCUMENTS

| 5,612,735 A | * | 3/1997 | Haskell et al. | 348/43 |
| 6,043,838 A | * | 3/2000 | Chen | 348/42 |
| 6,055,012 A | * | 4/2000 | Haskell et al. | 348/48 |
| 2002/0009137 A1 | * | 1/2002 | Nelson et al. | 375/240.1 |

OTHER PUBLICATIONS

'Encoding and reconstruction of multiview video objects' by Olm, J-R.; Signal Processing Magazine, IEEE; vol. 16, Issue 3, May 1999 pp. 47-54 ;Digital Object Identifier 10.1109/79.768572.*
S. Naito, et al; Advanced Rate Control Technologies for 3D-HDTV Digital Coding Based on MPEG-2 Multi-View Profile; Oct. 1999; pp. 281-285.

* cited by examiner

Primary Examiner—Nhon T Diep

(57) ABSTRACT

The present invention relates to a method and an encoder for encoding a digital video sequence, said digital video sequence comprising some sets of images including a disparity map, said disparity map being used to reconstruct one image of a set of images from another image of said set of images. The method is characterized in that it comprises the steps of:—encoding a type of a disparity map to be used for the reconstruction of an image, and—encoding the disparity map. Use: encoder in a video communication system

7 Claims, 1 Drawing Sheet

METHOD AND APPARATUS FOR ENCODING A DIGITAL VIDEO SIGNAL

The present invention relates to a method of encoding a digital video sequence, said digital video sequence comprising some sets of images including disparity maps, a disparity map being used to reconstruct one image of a set of images from a reference image of said set of images. The invention also relates to an encoder, said encoder implementing said method.

Such a method may be used in, for example, a video communication system for 3D video applications within MPEG standards.

BACKGROUND OF THE INVENTION

A video communication system typically comprises a transmitter with an encoder and a receiver with a decoder. Such a system receives an input digital video sequence, encodes said sequence via the encoder, transmits the encoded sequence to the receiver, then decodes the transmitted sequence via the decoder, resulting in an output digital video sequence, which is the reconstructed sequence of the input digital video sequence. The receiver then displays said output digital video sequence. A 3D digital video sequence comprises some sets of images with objects, usually one first set of texture images along with another set of images called disparity images or disparity maps. An image comprises some pixels.

Each image of the digital video signal is encoded along different general coding schemes, which have already been proposed within the scope of MPEG. For example, the MPEG2 standard referenced "Draft amendment N° 3 to 13818-2 Multi-view profile-JTC1/SC29/WG11N1088" edited by ISO/IEC in November 1995 during the MPEG Meeting of Dallas (Tex.), has set the basis for the encoding of different views of a same video sequence. The main principle is not only, as in most traditional video coding schemes, to use temporal and spatial redundancies within one video sequence, but also to use redundancies between the different points of view within a video sequence, wherein each point of view is an image, a left image and a right image catch, respectively, by a left camera and a right camera, for example. As objects of a video sequence seen from two slightly different points of view do not differ very much, it is possible to predict a large part of points of view from reference points of view by virtue of prediction vectors also called disparity vectors.

Since it is always possible to have disparity vectors that are all along the same direction, it often supposed that there are only horizontal disparity vectors. In this case, a disparity vector is defined by a single value, called disparity value. The disparity map is an image in which a disparity value is assigned to every pixel.

These disparity values are encoded by the encoder and transmitted to the decoder. A reference image is also sent to the decoder, for example the left one. Said decoder will use, amongst other parameters, the disparity values to reconstruct the right image from the reference image.

There are various encoding schemes well known to the person skilled in the art, like like DCT based, lossless run-length coding or mesh-based schemes, which can be used to encode an image. In all these encoding schemes, the disparity values are usually encoded on n-integer values, often on 8-bit data representing 256 gray levels.

One inconvenience of these encoding schemes is that, at the receiver side, one does not know exactly how to translate the disparity map of a texture image solely from these gray-level data.

Indeed, depending on a video sequence content, the disparity map of a texture image can change dramatically and hence the translation.

If the video sequence contains only objects filmed at a very close distance, disparity may need to be quite accurate, with sub-pixel accuracy. On the contrary, if the camera focuses on pretty far objects, sub-pixel accuracy might be of no interest, whereas there might be some very large values of disparity. Finally, there might be a mixed situation, with different regions of interests within the scene and a need of non-linear varying set of values of disparity.

Therefore, because of this problem of translation of the disparity map of the prior art, at the receiver side, there is often a manual tuning of the 3D display in order to:

view correctly in 3D the reconstructed video sequence, so that a reconstructed image is equal to, or has few distortions compared to the original one, and/or to view correctly in 3D a second 3D video sequence after a previous 3D video sequence, sent by 2 different broadcasters, for example, if these two video sequences have totally different disparity values assigned to them.

If the manual tuning has to be done very often, it will cause discomfort for a viewer of a 3D video sequence.

OBJECT AND SUMMARY OF THE INVENTION

Accordingly, it is an object of the invention to provide a method and an encoder for encoding a digital video sequence, said digital video sequence comprising some sets of images including disparity maps, a disparity map being used to reconstruct one image of a set of images from a reference image of said set of images, which allow a precise translation of the disparity map.

To this end, the method comprises the steps of:
encoding a type of the disparity map to be used for the reconstruction of an image, and
encoding the disparity map.

In addition, there is provided an encoder comprising first encoding means adapted to encode a type of the disparity map to be used for the reconstruction of an image, and second encoding means for encoding the disparity map.

As we will see in detail, by encoding the type of the disparity map, and more precisely by encoding the way to compute the disparity values from the 8 bits of gray levels, the disparity map of 3D video sequences is efficiently represented and the processing of the disparity map on the Display side of the video chain is made automatically.

BRIEF DESCRIPTION OF THE DRAWINGS

Additional objects, features and advantages of the invention will become apparent upon reading the following detailed description and upon reference to the accompanying drawings in which.

DETAILED DESCRIPTION OF THE INVENTION

Figure 1:
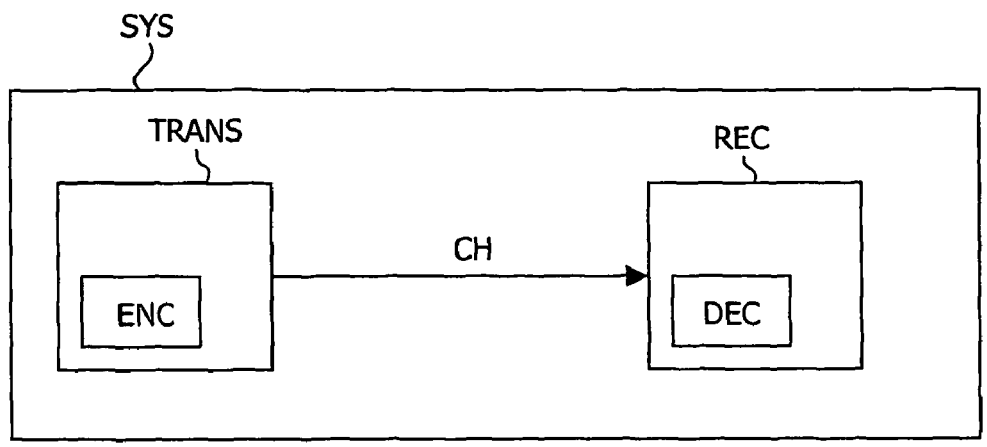
FIG. 1 illustrates a video communication system comprising an encoder and a decoder according to the invention.

In the following description, functions or constructions well known to the person skilled in the art are not described in detail because they would obscure the invention in unnecessary detail.

The present invention relates to a method for encoding a digital video sequence, said digital video sequence comprising some sets of images, usually one first set of texture images along with another set of images called disparity images or disparity maps. A disparity map is used to reconstruct one image of a set of texture images from a reference image of said set of texture images.

Such a method may be used within a video communication system SYS for 3D video applications in MPEG2 or MPEG4, wherein said video communication system comprises a transmitter TRANS, a transmission medium CH and a receiver RECEIV. Said transmitter TRANS and said receiver RECEIV comprise an encoder ENC and a decoder DEC, respectively.

In order to transmit efficiently some video sequences through the transmission medium CH, said encoder ENC applies an encoding on a video sequence, then the encoding video sequence is sent to a decoder DEC, which decodes said sequence. Finally the receiver RECEIV displays said video sequence.

A 3D video sequence comprises some sets of images with objects, wherein an image is represented by a plurality of pixels.

One object of a video sequence seen from two slightly different points of view does not differ very much. Therefore, a large part of points of view is predicted from reference points of view by virtue of prediction vectors, also called disparity vectors.

Since it is always possible to have disparity vectors that are all along the same direction—by rectification of the original stereo pair according to epipolar constraints, for example—it can be supposed that there are only horizontal disparity vectors (the common case of a "parallel stereo setting" of video cameras). In this case, a disparity vector is defined by a single value, called disparity value. In the remainder of the description, a disparity vector will be referred to as disparity value. Of course, this should in no way be restrictive. The disparity map is an image in which a disparity value is assigned to every pixel.

These disparity values allows definition of the shifting of a pixel of an object between a reference image and another image, at a time t, for example when said two images represent two different points of view of a same scene of the video sequence. The two points of view of a scene are issued by two cameras placed at different spots.

In order to be efficiently coded by compression algorithms, the disparity values are represented by n-integer values, often on 8-bit data representing 256 gray levels. The main issue is that the translation between the encoded n-integer values and the disparity values may be of different types.

The disparity map also relates to the depth of the objects of an image. Roughly, in most classic representations of 3D images, the more an object is far in a reference image (large depth), the less the movements of said object will be apparent in the reconstructed image. On the contrary, the more an object is near in the reference image, the more the movements of said object will be apparent in the reconstructed image.

In order to reduce the information that is transmitted via the transmission medium, redundancies between points of view are used. Thus, as objects seen from two different points of view do not differ very much, it is possible to predict one point of view from the other one. One point of view, the reference one, will be encoded and sent via the transmission medium CH to the receiver RECEIV. Said receiver RECEIV will decode it, reconstruct the original reference point of view and deduce the other point of view from the reference one thanks to the disparity vectors or values assigned to said reference point of view.

The encoder ENC comprises first encoding means adapted to encode a type of a disparity map to be used for the reconstruction of an image, and second encoding means for encoding the disparity map.

Figure 2:
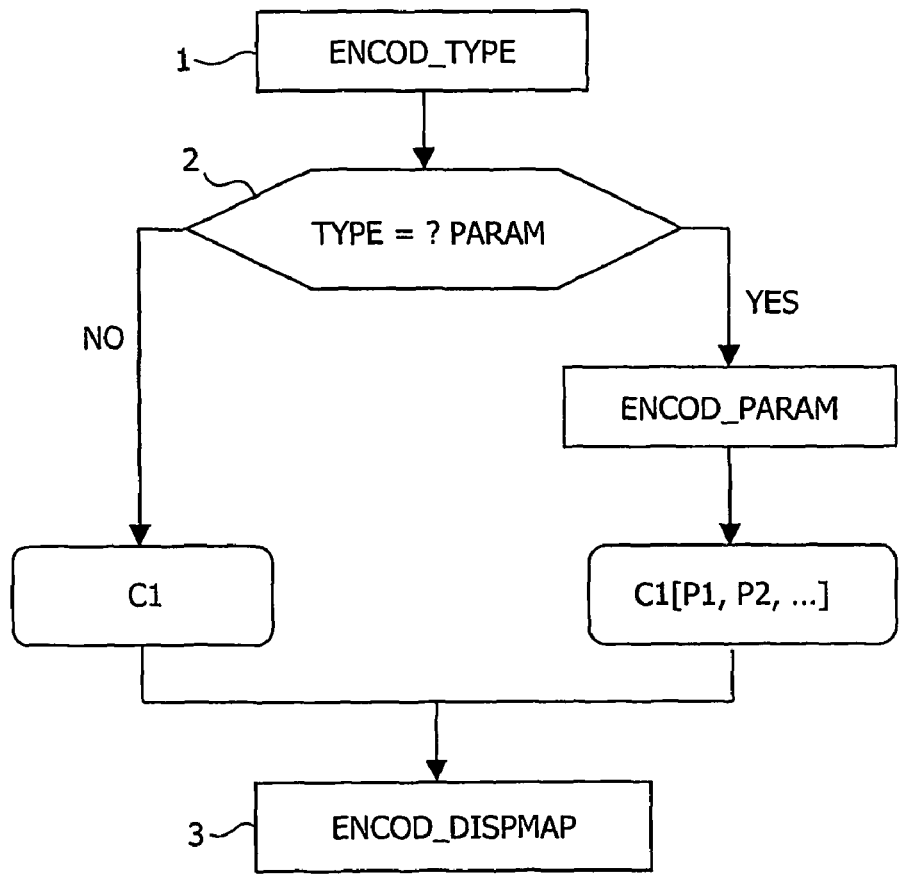
FIG. 2 is schematic diagram of the encoding method performed by the encoder of FIG. 1.

The encoding of a video sequence is done as follows and is illustrated in FIG. 2.

In a first step 1), the type of the disparity map is encoded, wherein the type represents the way the disparity values are to be translated, i.e. computed. In a non-limitative embodiment, a flag C1 encodes said type of disparity map. In a first variant mode of said embodiment, said flag C1 is set for each image within a video sequence. In a second variant mode of said embodiment, said flag C1 is set for a group of images, for example in the header of a group of images, said header being defined in the standard MPEG2 referenced "ISO/IEC 13818-2:2000 Information technology—Generic coding of moving pictures and associated audio information: Video".

This group of images, also referred to as GOP "Group Of Pictures", would have the particularity of having a same disparity map representation, i.e. the disparity values are computed in the same manner. The type flag can be coded on 3 bits, for example, to represent the disparity map. It may also have a variable length.

The following non-limitative representations can be applied for the disparity map: affine, logarithmic, polynomial, piecewise planar.

For example, in case of an affine representation, the disparity value is computed with the following formula.

Disparity value=(N-integer−Shift)/Dynaimic, wherein N_integer represents the 256 gray levels coded on 8 bits, Shift represents the 3D stereoscopic character of an image in relation to a user of the video system like a television (3D image giving the impression of being "in" or "out" of the screen), coded on 8 bits, and liamic represents the depth of the objects amongst them, coded on 4 bits.

In a second step 2), if the representation of the disparity map representation needs some parameters, these parameters are also encoded.

For example, in the case of the affine representation, the shift and the dynamic values are two parameters P1 and P2 that are encoded.

In a third and last step 3), the disparity map, i.e. the gray levels, is encoded with general coding methods like DCT, lossless method, mesh method . . . .

Preferably, the flag(s) C1 and the associated parameters P1, P2 . . . are put before the encoded disparity map. They are not necessarily transmitted just before the disparity map.

Note that a flag, and as the case may be its associated parameters P1, P2 . . . , are transmitted with the associated image or group of images.

At the decoder DEC side, the knowledge of the type flag will tell said decoder if it has to wait for additional parameters or not.

Thus, one advantage of the present invention is to tell the decoder, and therefore the receiver, how to use exactly the disparity representation on an image to reconstruct an image of a set of texture images from another one.

The use of a flag allows simple definition of the type of a disparity map. Moreover, it does not use too much memory, contrary to the use of a table, which would attribute to each value of the gray levels an explanation about how to move a pixel, for example.

Such a table has also the inconvenience of being transmitted each time the disparity map representation changes, that is to say, a lot of bits have to be transmitted.

Another advantage of the present invention is that it improves the reconstruction of a point of view on the basis of a reference point of view and the associated disparity map. Indeed, with the flag C1 and, as the case may be, with the parameters, the reconstruction of the reconstructed point of view is more precise and thus, the reconstructed point of view better fits the original point of view. The usage of the flag(s) to explain how the disparity map shall be interpreted allows consistent 3D effects to the viewer, whatever translation function was originally used to encode the disparity values.

Finally, a third advantage of the present invention is that, when it comes to the reconstruction of one view on the basis of a reference view and the associated disparity map, we have to fill the holes corresponding to parts of the reconstructed view that are not viewed in the reference view. The width of these holes depends on the dynamic of disparity an thus on the representation of the disparity map. If one wants to build an enhancement layer of images devoted to the filling of the holes in the reconstructed views, precise references to the way to compute the disparity values is now available.

It is to be understood that the present invention is not limited to the aforementioned embodiments and variations and modifications may be made without departing from the spirit and scope of the invention as defined in the appended claims. In this respect, the following closing remarks are made.

It is to be understood that the present invention is not limited to the aforementioned 3D video application. It can be used within any application using a system for processing a signal where said signal is characterized by gray levels such as a heating signal.

It is to be understood that the method according to the present invention is not limited to the aforementioned implementation.

There are numerous ways of implementing functions of the method according to the invention by means of items of hardware or software, or both, provided that a single item of hardware or software can carry out several functions. It does not exclude that an assembly of items of hardware or software or both carry out a function, thus forming a single function without modifying the method for processing the video signal in accordance with the invention.

Said hardware or software items can be implemented in several manners, such as by means of wired electronic circuits or by means of an integrated circuit that is suitably programmed, respectively. The integrated circuit may be contained in a computer or in an encoder. In the second case, the encoder comprises first encoding means adapted to encode a type of a disparity map to be used for the reconstruction of an image, and second encoding means for encoding the disparity map, as described previously, said means being hardware or software items as stated above.

The integrated circuit comprises a set of instructions. Thus, said set of instructions contained, for example, in a computer programming memory or in an encoder memory may cause the computer or the encoder to carry out the different steps of the decoding method.

The set of instructions may be loaded into the programming memory by reading a data carrier in the form of a computer-readable medium, such as, for example, a disc. A service provider can also make the set of instructions available via a communication network such as, for example, the Internet.

Any reference sign in the following claims should not be construed as limiting the claim. It will be obvious that the use of the verb "to comprise" and its conjugations does not exclude the presence of any other steps or elements besides those defined in any claim. The article "a" or "an" preceding an element or step does not exclude the presence of a plurality of such elements or steps.

The invention claimed is:

1. A method of encoding a digital video sequence for use within a video communication system, said digital video sequence comprising some sets of images including a disparity map comprising an image in which a disparity value is assigned to every pixel, said disparity map being used to reconstruct one image of a set of images from a reference image of said set of images, characterized in that the method comprises the steps of:

encoding with a first encoding means a type of the disparity map to be used for the reconstruction of an image, wherein the type (i) represents the way that disparity values of the disparity map are to be translated by a decoder within the video communication system, and (ii) explains to the decoder how to use exactly the disparity map on the reference image to reconstruct one image of the set of images from another one; and encoding with a second encoding means the disparity map.

2. The method of processing a digital video sequence as claimed in claim 1, characterized in that the encoding of the type of the disparity map is done by means of a flag, wherein use of the flag allows simple definition of the type of disparity map.

3. The method of processing a digital video sequence as claimed in claim 1, characterized in that the encoding of the type of the disparity map is followed by a set of encoded parameters.

4. A computer-readable medium having encoded thereon a computer program for execution by an encoder, said computer program comprising a set of instructions, which, when loaded into said encoder, causes the encoder to carry out the method claimed in any one of claims 1 to 3.

5. A computer-readable medium having encoded thereon a computer program for execution by a computer, said computer program comprising a set of instructions, which, when loaded into said computer, causes the computer to carry out the method claimed in any one of claims 1 to 3.

6. An encoder for encoding a digital video sequence, said digital video sequence comprising some sets of images including a disparity map comprising an image in which a disparity value is assigned to every pixel, said disparity map being used to reconstruct one image of a set of images from a reference image of said set of images, characterized in that the encoder comprises:

first encoding means for encoding a type of the disparity map to be used for the reconstruction of an image, wherein the type (i) represents the way that disparity values of the disparity map are to be translated by a decoder within a video communication system, and (ii) explains to the decoder how to use exactly the disparity map on the reference image to reconstruct one image of the set of images from another one; and second encoding means for encoding the disparity map.

7. A video communication system, which is able to receive a digital video sequence, said video communication system comprising an encoder as claimed in claim 6 for encoding said video signal, a transmission channel for transmitting the encoded video signal, and a decoder for decoding said encoded video signal.

* * * * *